United States Patent [19]

Wine

[11] 4,330,879
[45] May 18, 1982

[54] ADAPTIVE STYLUS KICKER USING DISC TRACK AND DISC SECTOR INFORMATION

[75] Inventor: Charles M. Wine, Princeton, N.J.

[73] Assignee: RCA Corporation, New York, N.Y.

[21] Appl. No.: 86,245

[22] Filed: Oct. 18, 1979

[51] Int. Cl.$^3$ .......................... G11B 17/22; G11B 9/00
[52] U.S. Cl. ....................................... 369/32; 369/33; 369/41; 369/126
[58] Field of Search .......................... 358/128.5, 128.6; 360/72.2, 78; 179/100.16, 100.30, 100.3 V, 100.46; 369/43

[56] References Cited

U.S. PATENT DOCUMENTS

| | | | |
|---|---|---|---|
| 3,963,860 | 6/1976 | Burrus | 179/100.40 X |
| 3,963,861 | 6/1976 | Crooks | 179/100.40 X |
| 3,973,080 | 8/1976 | Dickopp et al. | 179/100.4 D X |
| 4,000,510 | 12/1976 | Cheney et al. | 360/72.2 X |
| 4,094,013 | 6/1978 | Hill et al. | 365/215 X |
| 4,142,209 | 2/1979 | Hedlund et al. | 358/128.5 |
| 4,159,480 | 6/1979 | Tachi | 358/8 |
| 4,167,759 | 9/1979 | Tachi | 360/14 |
| 4,176,378 | 11/1979 | Toda et al. | 360/DIG. 1 X |
| 4,183,059 | 1/1980 | Palmer | 179/100.40 X |

FOREIGN PATENT DOCUMENTS 1469483 4/1977 United Kingdom .

OTHER PUBLICATIONS

VIR II System–Kim; IEE Transactions on Consumer Electronics, vol. CE-24, No. 3, Aug. 1978.

Primary Examiner—Aristotelis M. Psitos
Attorney, Agent, or Firm—E. M. Whitacre; J. S. Tripoli; E. P. Herrmann

[57] ABSTRACT

An adaptive video disc record stylus kicker system for inducing limited stylus translations radially across the disc record. Control circuitry responsive to disc track and disc angular sector identification signals automatically calibrates the kicker activation signals to produce a desired kicker induced stylus translation. A microprocessor establishes a table containing kicker control signals for driving the kicker in each sector of the disc. For a given kicker induced stylus translation, the error is calculated between the actual stylus translation and the programmed stylus translation and the control signal for the respective sector is adjusted accordingly. Subsequently the control signals for each of the other sectors are altered proportional to the adjustment made to the particular control signal in accordance with a correlation function.

7 Claims, 9 Drawing Figures

ADAPTIVE STYLUS KICKER USING DISC TRACK AND DISC SECTOR INFORMATION

This invention relates to apparatus utilized in the playback of a video disc record and more particularly to apparatus for repositioning a player signal pickup stylus from one convolution of a signal encoded information track disposed on the disc to another.

Certain capacitive video disc systems incorporate record discs with information recorded by means of geometric variations in a conductive medium disposed proximate the bottom of a smooth spiral groove in the surface of a record disc.

Such disc records typically have groove densities of 4,000 to 8,000 grooves per inch and, in some cases close to ten thousand groove convolutions per inch, and are subject to occasional flaws causing premature termination of the spiral groove. Such premature termination frequently causes an outward translation of the pickup stylus resulting in an undesired and annoying repetition of a particular groove convolution during disc playback (referred to as a locked groove). In order to correct such undesirable outward stylus translation, certain playback apparatus incorporate systems for determining the occurrence of a locked groove and also incorporate mechanism for imparting an inward motion to the stylus relative to the pickup arm support assembly. See for example U.S. Pat. No. 3,963,861 entitled, "Disc Record Groove Skipper Apparatus", U.S. Pat. No. 3,963,860 entitled, "Locked Groove Detection and Correction in Video Disc Playback Apparatus", and U.S. patent application Ser. No. 908,515, filed May 22, 1978, entitled "Track Skipper for a Video Disc Player", and assigned to the same assignee as the present invention; for representative stylus skipping mechanisms.

Because the dimensions of the stylus, groove, and groove pitch, etc., are particularly small and the dimensions of the stylus arm, stylus carriage, disc record and the kicker mechanisms, etc. are relatively large, provision for dynamic adjustment of each kicker assembly-stylus-disc is desirable. Control circuitry can be implemented to initiate a kicker induced stylus translation and calculate the error between the programmed kicker induced stylus translation and the actual kicker induced stylus translation. The control circuitry will then adjust the kicker energization signals in such manner to reduce the error and iterate this cycle until the actual kicker induced stylus translation comports with the programmed kicker induced stylus translation. For the condition that the kicker will always be activated at the same disc angular coordinate, satisfactory performance is obtained from such a system.

On the other hand, video disc systems which are required to produce kicker induced stylus translations at least at each angular occurrence of the vertical blanking interval of the recorded signal, require that the kicker system be calibrated for each of these points. It can readily be appreciated that a warped disc establishes varying stylus-disc interaction depending upon whether the stylus is in contact with a disc "high" point or "low" point. These interactions are manifested as variations in stylus-disc pressure which affect the stimulus required of the kicker to translate the stylus. Similarly groove eccentricities impose opposing mechanical biases at 180° increments which affect kicker drive requirements.

The present invention automatically adapts the stylus kicker apparatus to its associated stylus assembly and to the particular disc record being played. Control circuitry is programmed to divide the disc record in sectors. Said circuitry induces a partial kicker calibration for an arbitrary sector of the disc as described in the foregoing and applies the resultant calibration factor to each of the remaining sectors in accordance with an angularly dependent correlation function. Each time a particular sector undergoes either partial or complete calibration the new coefficients are translated to the remaining sectors via the correlation function. In this manner the total number of calibration operations are reduced and interference with normal record playback is reduced.

Figure 1:
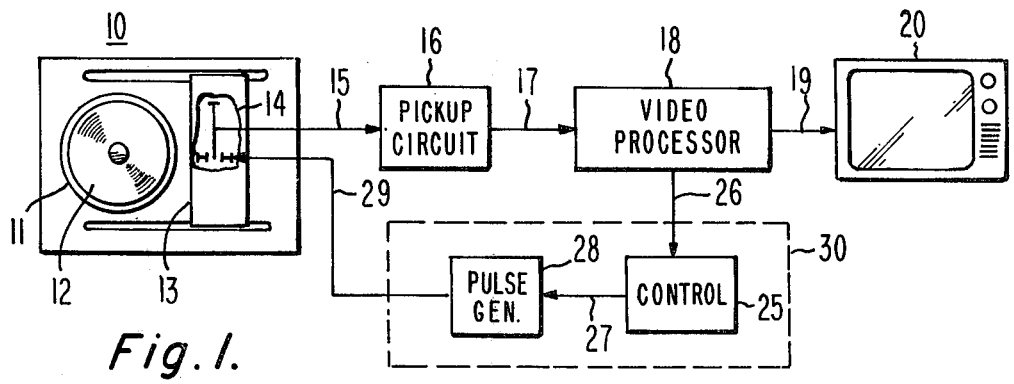
FIG. 1 is a block diagram of a record disc playback system including an adaptive kicker.

In the video disc playback system of FIG. 1, player 10 has a turntable 11 for rotatably supporting a record disc 12 having an information track which may be spiral or concentric in form. Each track or convolution of the spiral track on the disc contains picture signal information inclusive of synchronization components plus information identifying the particular track. A stylus assembly 14 including a signal pickup stylus and a kicker apparatus, for imparting motion to translate the pickup stylus over one or more convolutions of the groove, is mounted in the carriage mechanism 13 for radial translation of the stylus assembly across the record. Capacitance variations occurring between the stylus and the disc record are detected by pickup circuits 16 and applied to the video processor 18 to format the signal for display by a conventional TV receiver 20. Control circuitry 25 responsive only to the track identification signal monitors the track numbers. Upon the occurrence of an undesired or anomalous stylus progression the control circuitry 25 applies a signal of a prescribed nominal value (analog or digital signal) to the pulse generator 28. Pulse generator 28 generates a pulse of appropriate shape and/or amplitude to energize the stylus kicker to translate the stylus a desired number of convolutions. If the stylus fails to move or skips more than the desired number of convolutions the control circuitry 25 respectively increments or decrements the control signal value and initiates a further kick. The contoller iterates through this process until the proper control signal is established to accomplish the particular stylus translation desired.

Several options are available regarding the time and manner of providing such adaptive stylus movement. A first method is to perform kicker adaptation immediately upon the stylus engaging the record disc in a pre-play band having information recorded for calibrating the player. Once the control pulse parameters are established they constitute fixed constants for the remainder of play of the particular disc.

A second method is to incorporate calibration of the kicker system as described immediately above with the added flexibility of having the system readapt the control pulse parameters whenever a kick produces improper results.

A third method is to have the system calibrate upon the first occurrence of an abnormal stylus progression.

A fourth method is to partially calibrate the kicker system for each occurrence of an abnormal stylus progression.

Figure 2:
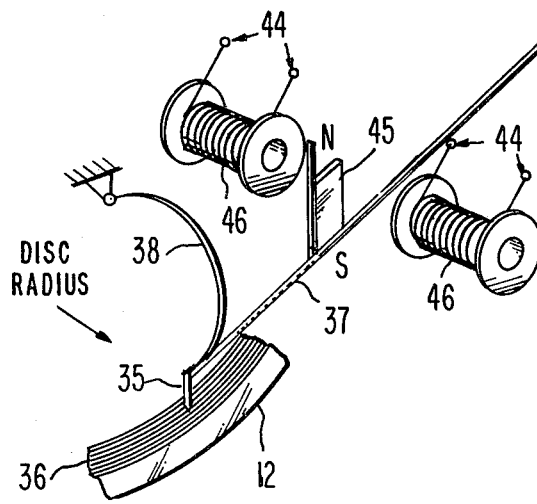
FIG. 2 is a diagrammatic representation of a stylus-arm assembly having an electromagnetic kicker apparatus.

FIG. 2 illustrates a stylus-kicker assembly. A stylus 35 having a signal pickup electrode thereon is contoured to engage the grooves 36 of record disc 12. ELECTRICAL contact to the electrode is made via flylead 38. The flylead 38 also produces a degree of pressure between the stylus and the record. Stylus 35 is mounted to the free end of stylus arm 37, the opposite end of which is attached to the carriage assembly 40 by a compliant coupling 39 which permits limited freedom of movement of the stylus arm in three dimensions. A permanent magnet 45 is fixedly mounted to the stylus arm 37 relatively near the stylus and arranged to be in the magnetic field lines emanating from the selectively energized electromagnets or coils 46 when the stylus is in the play position. The coils 46 having nonmagnetic cores are electrically connected to produce aiding fields to impart a radial movement to magnet 45 and consequently movement of the stylus when the coils are energized.

Figure 3:
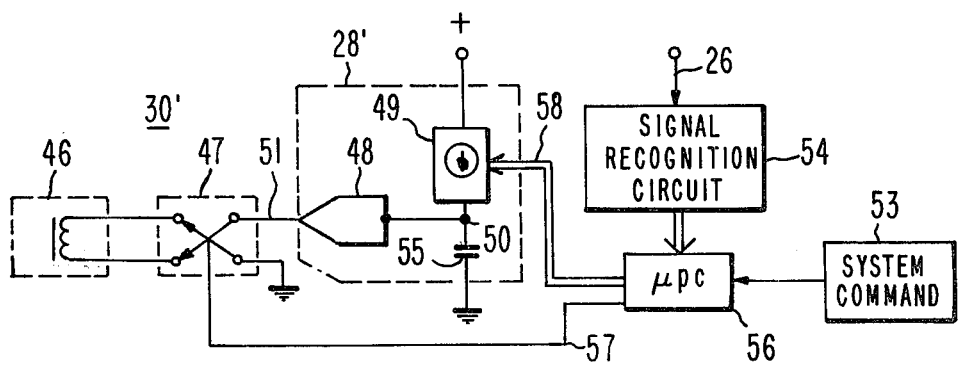
FIG. 3 is a block diagram of an adaptive stylus kicker system.

The partial schematic-partial block diagram of FIG. 3 illustrates an adaptive kicker system for the player 10. In FIG. 3 a microprocessor 56 assumed to include the requisite associative circuitry for normal operation responsive to system or program commands (53) from the player controls, monitors the stylus position via track identification signals and applies inward or outward kick signals in accordance with the mode of playback. For example, if a particular video sequence is to be "frozen", at that point in the record playback, the stylus is kicked one convolution or track outward for each revolution of the disc. The microprocessor 56 receives track identification signals from the recognition circuit 54, calculates the proper stylus position and current errors in the stylus position and determines appropriate control signal adjustments to apply to the programmable pulse generator 28' and the switch 47 to reposition the stylus in the direction of the proper or the desired track. The pulse generator 28' produces a ramped voltage proportional to the control signal applied by the microprocessor via input bus 58. The pulse generator output signal at connection 51 is applied to the reversing switch 47 for application to the stylus kicker coil 46. The reversing switch 47, controlled by the microprocessor 56 via bus 57 governs the direction of current flow through the stylus kicker coil 46 and thereby the direction of the magnetic field created between the coils and consequently the direction of stylus movement.

The pulse generator 28' includes a current source circuit 49 providing a high impedance regulated current in a first mode and a low impedance connection to a reference potential in a second mode. When the current source is operated in the second mode the potential across capacitor 55 is clamped at the reference potential. Switching the current source 49 to its first mode causes the potential at connection 50 to monotonically increase in accordance with the charging rate of capacitor 55, i.e., $$V = 1/C \int I\, dt \approx \frac{It}{C} \qquad (1)$$

where I is the amplitude of the current supplied by source 49, C is the capacitance value of capacitor 55 and t is the charging time.

The potential at connection 50 is buffered by amplifier 48 which generates the requisite range of output currents to drive the stylus kicker coil 46.

Figure 4A:
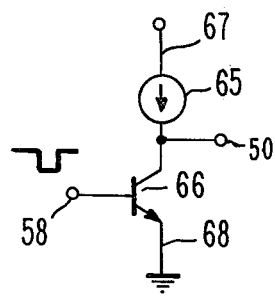
FIGS. 4A and 4B illustrate programmable current sources.

A particular embodiment of the current source 49 is illustrated in FIG. 4A. A conventional current source 65 is serially connected in the collector circuit of transistor 66 between supply terminals 67 and 68. A positive control potential with respect to supply terminal 68, applied to control input 58 causes the transistor 66 to conduct, shunting all the current, I, from source 65 to terminal 68. A negative control potential turns transistor 66 off making the current I, available at output connection 50.

Figure 5A:
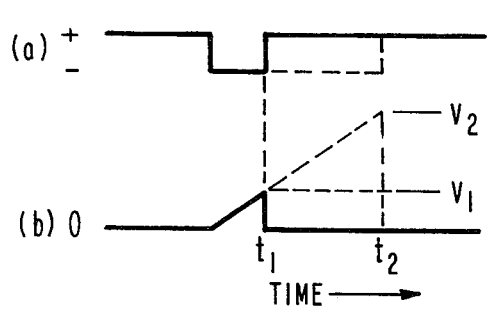
FIGS. 5A and 5B are graphic representations of the output signal responses for the pulse generator circuit of FIG. 3 respectively with the circuits of FIGS. 4A and 4B substituted for the programmable current source.

FIG. 5A illustrates the response of the programmable pulse generator 28' with the FIG. 4A circuit employed as the current source circuit. FIG. 5A(a) illustrates the control pulse applied to the pulse generator and 5A(b) the pulse generator response. From equation (1) it is seen that for a particular constant current I, the duration "t" of the control pulse programs the output amplitude "v" of the pulse generator; the wider the negative control pulse the higher the output amplitude of the waveform "v".

Figure 4B:
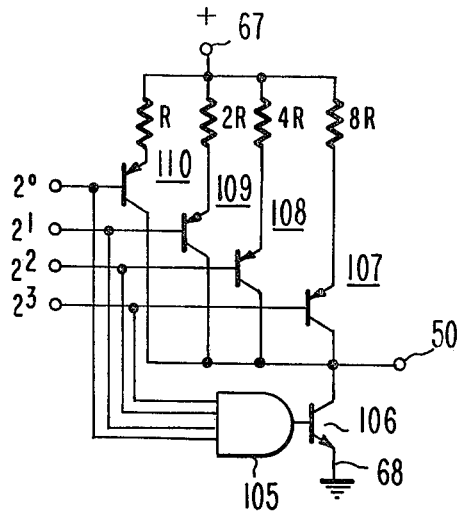

FIG. 4B is a binary programmable current source for producing 16 discreet output current levels. Assuming each of the binary inputs $2^0-2^3$ have equal amplitude potentials, the current amplitudes of each of the respective current sources 107 to 110 is determined approximately by the input potential divided by the respective emitter resistor. The currents are summed and made available at connection 50. Since the resistors have binary weights, i.e., R, 2R, 4R, 8R, each of the currents from the respective sources 110, 109, 108 and 107 have binary weights making the combination a binary programmable current source. Each of the sources 107 to 110 are conditioned to conduct by a logical low signal applied to their respective input connections. Consequently, a high signal applied to all binary inputs $2^0$ to $2^3$ turns the composite current source off and turns transistor 106 on via logical "AND" circuit 105. With transistor 106 conducting the connection 50 is clamped to the reference potential at terminal 68.

Figure 5B:
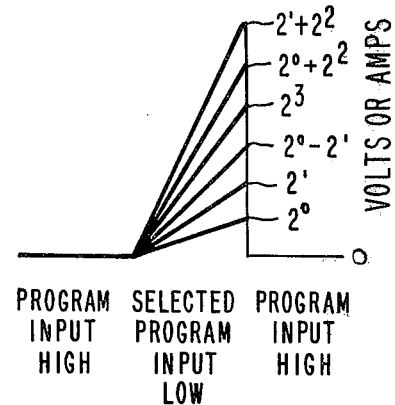

FIG. 5B illustrates the output response of the programmable pulse generator 28' with the FIG. 4B circuit implementing the current source 49. In accordance with equation (1) it is noted that for a constant charging or integration time the output signal increases as the magnitude of current I is increased.

Figure 6:
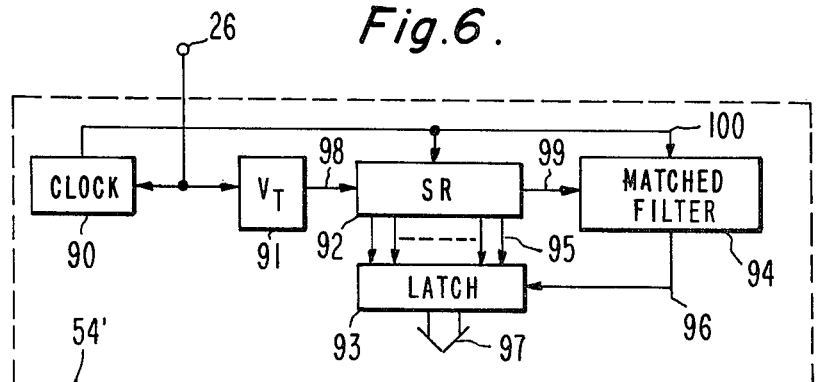
FIG. 6 is a block diagram of an embodiment of the signal recognition circuit of FIG. 3.

The recognition circuit 54' shown in FIG. 6 provides identification data recorded in a particular format for use by the microprocessor. Consider a video disc in which information is recorded in a generally NTSC format having vertical and horizontal blanking intervals. Normally, the first 21 horizontal lines of each field of display contain no usable video information, thus that portion of a field may be used to contain track identification information. If there exist more than one field per track or convolution, and the fields are radially aligned from track to track so that each field of a track defines an angular sector of the disc, both track and sector information may be included. By way of example consider a record disc having a spiral groove with eight fields per convolution, the fields from convolution to convolution being aligned in eight 45 degree sectors. Assume also that on the nineteenth horizontal line of each field that a digital signal is recorded inclusive of an N bit recognition signal followed by an M bit identification signal. The M bit identification signal identifies the convolution and the sector and the N bit recognition signal is used to alert the system that the subsequent M bits comprise useful data, e.g., track numbers. Assume that the maximum bit rate is equal to and synchronized with a fundamental system frequency such as the color burst frequency. Demodulated video signals from the video processor are applied via connection 26 to the clock generator 90 and threshold detector 91. Clock 90 generates a system clock, oscillating at a constant frequency equal to the requisite fundamental frequency and synchronized therewith, suitable for driving logic circuitry. The threshold circuit conditions the video signal, inclusive of the digital information to a two level signal having normal logic level amplitudes. The signal from threshold circuit 91 is sequenced, by the clock signal at connection 100, through the M bit serial-parallel shift register 92 and into the N bit matched filter 94. When η sequential bits of the signal applied to filter 94 match a recognition signal programmed into the filter, the filter 94 outputs a correlation pulse on connection 96. The following M signal bits concurrently contained in register 92 are the track and sector information bits. M bits of information available from M parallel output connections 95 are latched and formatted for use by the microprocessor by LATCH circuit 93 responsive to the correlation pulse occurring on connection 96.

An alternative to using a recognition signal (code), to prompt the system, is to use circuitry to recognize the particular horizontal line in which the track identification information is recorded. One such system is described in the article "VIR II System" by S. K. Kim, published in the IEEE Transactions on Consumer Electronics, Vol. CE-24, No. 3, August 1978.

The FIG. 3 calculating means is illustrated as a microprocessor 56, though it may be implemented with a less powerful circuit or system dedicated solely to the task of generating the proper energization of a kicker assembly to achieve a desired stylus translation.

Figure 7:
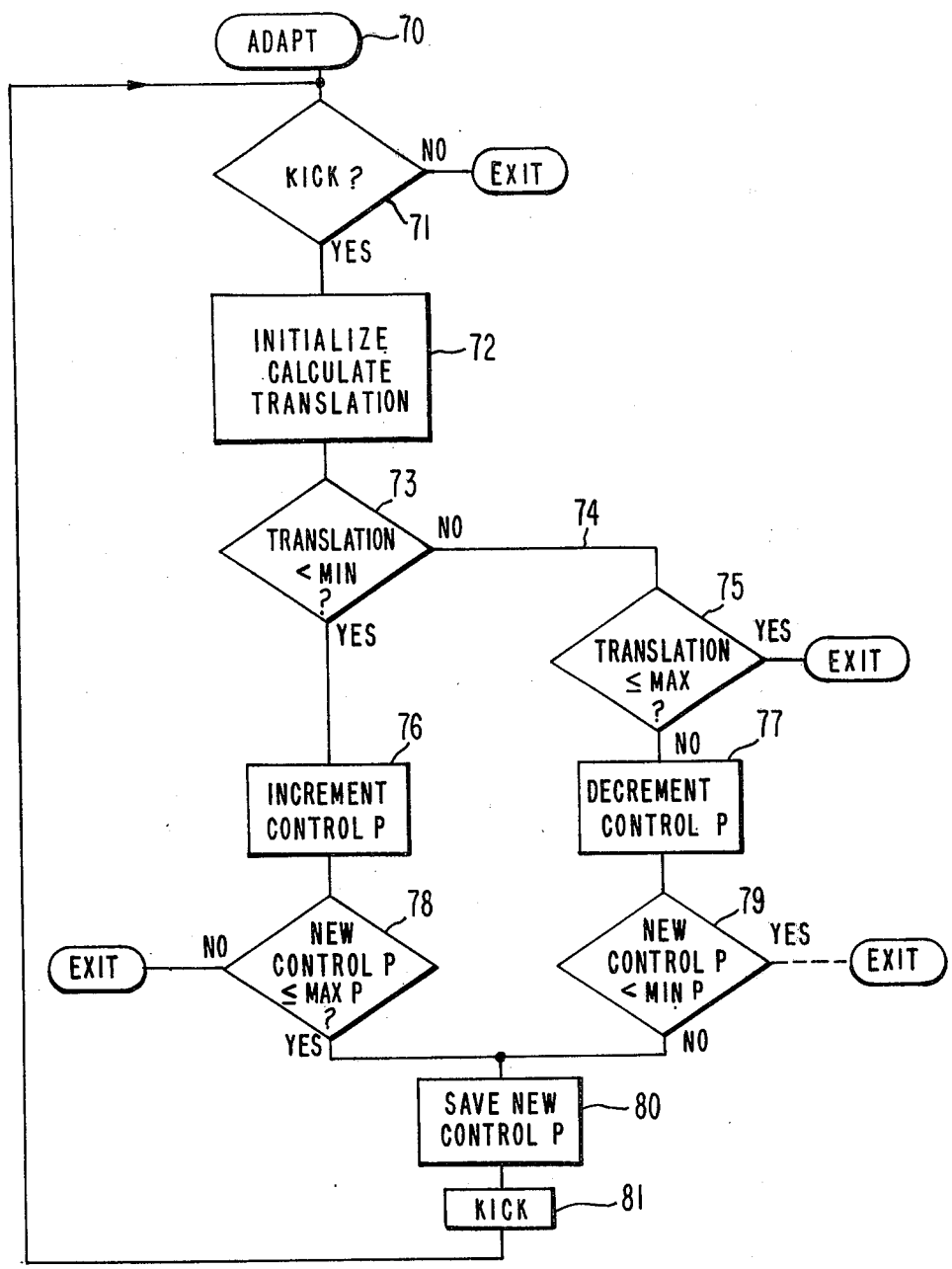
FIG. 7 is a flow chart illustrating a sequence by which the system of FIG. 3 adapts the stylus kicker to the physical parameters of the player/record system.

An illustrative sequence of events for determining the necessary kicker drive parameters is outlined by the FIG. 7 flow chart. The routine does not include general system monitoring and kick control. This particular routine assumes that adaptive parameters will be generated on the first occurrence of a stylus kick and every kick thereafter which produces an improper stylus translation.

Once the adaptive sequence is initiated a first decision point 71 determines whether the system attempted a kick. If a kick did not occur the system has no measured values to determine the performance of the kicker and the system exits the adaptive program. If a kick was attempted the system initializes (72) on the current groove convolution being tracked and calculates the number of groove convolutions skipped by subtracting the last-most previously detected groove convolution number from the current number. The system orients to whether an inward or outward kick was performed and whether an inward or outward stylus translation occurred. Having established these circumstances the particular kick control parameters are accessed for possible alteration.

A decision point 73 compares the immediate stylus translation with the minimum value programmed for the particular kick. If the stylus translation is less than the minimum set for the translation range programmed, the kicker control parameters are incremented (76), i.e., the parameters are adjusted to produce a kick greater than the previous kick. Each increment to the control parameters may be a fixed constant, or for calculating means of sufficient computational power, the increments may be proportioned to the stylus translation error.

Once the control parameters are incremented, the new parameters are checked against a preset maximum (78). If the parameters equal or exceed the maximum, the routine is exited to preclude the system for performing an endless iteration possibly damaging the player or the disc record. On the other hand if the new control parameters are within the acceptable maximum limit, the incremented parameters are established (80) as the kicker control values for the kick corresponding to the particular program command. The system then initiates a kick (81) to iterate the routine.

At decision point 73 a stylus translation exceeding the minimum causes a branching to decision point 75 which determines whether the stylus translation exceeded a preset range maximum. If it has not, then the system assumes it is operating with proper control parameters and the kicker adaptation is complete for the particular program command. If the stylus translation exceeds the maximum, the control parameters are decremented (77) or adjusted to produce a lesser kick. The decremented parameters are checked against a preset minimum and saved (80) if they are in the acceptable range or else the routine is exited to prevent damage to the system.

A table of control parameters is maintained for each particular type of kick since the kicker requirements for different conditions may differ. The stylus arm dynamics for inward movement differ from the dynamics for outward movement as a result of inherent mechanical bias. Thus the kicker force and accordingly the kicker control parameters differ for inward and outward stylus translation. Additionally, a K groove inward stylus translation will necessitate different drive parameter than an H groove inward stylus translation, etc., where K and H are arbitrary integers.

Record discs containing sector identifying data as well as track or groove convolution identifying data permit embellishments to the adaptive process. Warped records tend to cause varying degrees of stylus-disc pressure as the non-uniform surface passes under the relatively fixed position of the stylus assembly. As a practical result, the energy required to kick the stylus a given number of groove convolutions is related to the angular position of the disc. Similarly groove eccentricity creates kicker drive requirements which have an angular dependence. Thus if sector information is available to the kicker controller it is desirable to establish control pulse parameters for each sector. In implementing the sector dependent adaptive stylus kicker, an S entry table (where S equals the number of sectors on the disc) is maintained for each type of kick command. The entries contain the control parameters to be used for energizing the kicker in each of the S sectors. When the stylus is to be kicked, the upcoming sector is used as an index to the table and the appropriate parameter is fetched and used to establish the kicker drive.

Angularly dependent kick pulse requirements due to eccentricity and warpage are not random, but generally approximate correlation functions. Groove eccentricity produces an outward stylus/stylus arm bias at the angle of maximum runout and an inward stylus/stylus arm bias 180° therefrom. Intermediate these extremes the bias goes to zero. It can easily be appreciated that the bias function approaches a cosine function, dependent on sector displacement. Similarly disc warpage has been found generally to assume a wavelike configuration having crests displaced 180° apart, and troughs displaced 180° apart. The functional relationship approaches that of a cosine of twice the angular displacement. The overall correlation function may be approximated by:

$$F = G\left(1 + E \cos(\theta_S) + W \cos 2\left(\theta_S + \eta \frac{360}{S}\right)\right) \quad (2)$$

where F is the correlation function, G is a nominal value or gain factor, E is a measure of eccentricity, W is a measure of warpage, $\phi_S$ is angular position of the disc measured from an arbitrary sector and incremented each sector by 360/S degrees, and $(\phi_S + \eta 360/S)$ is an angular displacement offset from $\phi_S$ by integral numbers $\eta$ of sectors S in degrees.

When the correlation function is used, the stylus is kicked and the stylus displacement is examined. If the kicker has not caused some minimum displacement, e.g., one groove convolution, the drive parameter for that sector is incremented and substituted into the table of drive parameters for the requisite sector. In addition, the incremented parameter is multipled by the correlation function corresponding to each sector to generate new drive parameters for the remaining sectors and these are added to the S entry table of values in the appropriate angular offset. If the kick caused too great a displacement, the function is subtracted from the table of values with the appropriate angular offset. The result of using the correlation function is that single adaptive correction to one sector can be applied via the function to all of the sectors reducing the operational sequences to calibrate the kicker.

As a practical matter it is time-consuming to implement the equation (2) function containing both cosine functions. Thus kicker response is monitored for a constant kick control parameter applied to the kicker in a number of sectors to determine whether the correlation is dependent on the angular displacement or twice the angular displacement to ascertain the dominant features for the particular record. The correlation function is then reduced to $$F = G(1 + E \cos(\phi_S)) \quad (3)$$

or $$F = G(1 + W \cos(2\phi_S)) \quad (4)$$

Note the values of E and W can be experimentally determined for a particular system or they may be established as part of the adaptive process. For example consider that it has been established that the correlation function of equation 3 is dominant by generating a constant kick in each sector. The zero reference or starting angle is assigned to that sector which produces the smallest stylus translation. The remaining sectors are assigned angular values in increments of 360/S degrees (this assumes that kicks are generated in correspondingly similar areas in each sector). Assume a disc having four sectors, and that the stylus translations for consecutive sectors for a constant kick force are respectively $T_0$, $T_1$, $T_2$ and $T_3$. These translations are directly proportional to the sector dependent stylus resistance to lateral movement and therefore inversely dependent to the compensating correlation function, i.e., $T_i \approx 1/G(1 + E \cos \phi_i)$. Assume that translations $T_0$ and $T_2$ correspond to sectors assigned angular values of 0° and 180° respectively. Dividing the equation for $T_0$ by the respective equation for $T_2$ produces $$\frac{T_0}{T_2} = \frac{G(1 + E \cos \theta_2)}{G(1 + E \cos \theta_0)} \quad (5)$$

solving for E $$E + (1 - T_0/T_2)/(T_0/T_2 \cos \phi_0 - \cos \phi_2) \quad (6)$$

and substituting the values for $\phi_0$ and $\phi_2$ $$E = -(1 - T_0/T_2)(1 + T_0/T_2) \quad (7)$$

The coefficient W in equation (4) may be determined in a similar fashion. The coefficient "G" is arbitrarily established at some nominal value known to produce stylus translation. Therefore, by making a series of measurements—one per sector with a constant kick force and performing the algebraic manipulation of equation (7) the correlation functions are determined.

In a typical system, however, determination of the coefficients "E", "G" and "W" would not be part of the adaptive process because the correlation function is desirably employed to reduce the number of experimental or measuring kicks applied to the system. Thus the coefficients would be preset to a statistically determined nominal value.

What is claimed is:

1. An improved video disc player system for recovering recorded information from disc records having information bearing tacks, said information including track identification signals and disc angular position signals corresponding to pie-shaped sectors of said disc records, said system having a signal pickup stylus mounted to one end of a stylus arm, the other end thereof mounted to a carriage for translation of the stylus radially across said disc record at a substantially uniform rate and having a kicker apparatus mounted in said carriage for selectively imparting limited translation of the stylus radially across said disc, said kicker apparatus being energized by a programmable pulse generator producing drive signals dependent on control signals applied thereto, wherein the improvement resides in circuitry for generating sector dependent control signals for producing stylus translation calibrated to a disc being played, said improvement comprising:
   circuitry connected to said signal pickup stylus for generating a substantially digital signal responsive to said disc record track identification and disc angular position signals; and
   control circuitry responsive to said digital signal for generating control signals including,
   (a) means programmed to produce respective nominal control signals and thereby induce nominal stylus translations in said disc sectors;

(b) means for comparing successive track identification signals to determine whether respective programmed kicker produced stylus translations equal said nominal stylus translations;

(c) means for adjusting by increments said nominal control signals when said respective programmed kicker produced stylus translations are not equal to said nominal translations in such manner to tend to conform programmed kicker performance with actual kicker performance thereby generating corrected nominal control signals; and (d) means responsive to disc angular position signals for storing said corrected nominal control signals and associating said corrected control signal with respective ones of the disc sectors.

2. The video disc player system set forth in claim 1 wherein the control circuitry is programmed to produce kicker imparted stylus translations in each disc record sector, said stylus translations being compared with the programmed translations for generating corrected control signals for each sector.

3. The video disc player system as set forth in claim 1 wherein the control circuitry includes means to alter the control signals for each disc sector in accordance with a correlation-function related substantially to the disc eccentricity and warpage, following a control signal calibration for a single sector.

4. The video disc player system as set forth in claim 3 wherein the correlation function is proportional to $1 + E \cos \phi$ where E is a coefficient related to disc track eccentricity and $\phi$ is a fixed angular displacement assigned to each disc sector relative to an arbitrary reference sector.

5. The video disc player system as set forth in claim 3 wherein the correlation function is proportional to $1 + W \cos 2\phi$ where W is a coefficient related to disc warpage and $\phi$ is a fixed angular displacement assigned to each disc sector relative to an arbitrary reference sector.

6. The video disc player system as set forth in claims 1 or 2 or 3 or 4 or 5 wherein the control circuitry is a microprocessor.

7. In combination with a disc record player mechanism for recovering information from a disc record having information bearing tracks, said information including track and sector identification signals, the player mechanism having a carriage mechanism for translating a signal pickup stylus radially across said disc record and wherein the signal pickup stylus is mounted to a first end of a stylus arm, the second end of the stylus arm being supported in said carriage mechanism by a compliant coupling, and wherein the player is programmed for play by player operating commands, an adaptive stylus kicker system comprising:

kicker means mounted in said carriage mechanism and cooperating with said stylus arm for selectively imparting limited translation of the stylus radially across said record responsive to drive signals;

a programmable pulse generator responsive to control signals for generating said drive signals applied to the kicker means;

control circuitry responsive to the track and sector identification signals for generating said control signals for discrete sectors of the disc record, said control circuitry including:

(a) programmed means for generating nominal control signals to induce said kicker means to produce corresponding nominal stylus translations;

(b) means for comparing successive track identification signals thereby determining whether actual kicker induced stylus translations equal said nominal stylus translations induced by said nominal control signals;

(c) means for correcting the nominal control signals so that stylus translations produced by the corrected control signals equal said nominal stylus translations;

(d) means responsive to the disc sector signals for storing the corrected control signal associated with respective sectors; and (e) means responsive to a corrected nominal control signal associated with a particular disc sector for altering control signals associated with remaining disc sectors in accordance with a correlation function substantially related to disc eccentricity and warpage.

* * * * *